March 1, 1949.    M. W. GREDELL    2,463,100
TWO-SPEED AUTOMATIC POWER TRANSMISSION
Filed Dec. 19, 1947

INVENTOR.
MARCELLUS W. GREDELL
BY Edward M. Apple
ATTORNEY

Patented Mar. 1, 1949

2,463,100

UNITED STATES PATENT OFFICE 2,463,100

TWO-SPEED AUTOMATIC POWER TRANSMISSION

Marcellus W. Gredell, Detroit, Mich.

Application December 19, 1947, Serial No. 792,776

6 Claims. (Cl. 74—217)

1

This invention relates to power transmissions, and has particular reference to an automatic transmission having two speeds.

An object of the invention is to provide an automatic transmission suitable for use with power bicycles, motor scooters, and other devices which require high static torque and lower running torque.

Another object of the invention is the provision of an automatic two speed transmission which is highly desirable for use with light weight variable speed gasoline engines such as now employed to drive motor scooters and the like.

A further object of the invention is to provide a variable speed transmission which is completely controlled automatically by the engine R. P. M. in such manner that it cannot be abused or misused by the operator.

Another object of the invention is to provide an automatic transmission which is simple in construction, inexpensive to manufacture, and one which may be adapted to a variety of applications through the use of belt or chain drives.

A still further object of the invention is to provide a two speed automatic transmission through which practically any horsepower may be transmitted at any desired speed ratio.

Another object of the invention is to provide a device of the character indicated in which the changes from low to high speed may be controlled through various engine R. P. M.'s by predetermining the engagement speeds of the centrifugal clutches.

Another object of the invention is to provide an automatic transmission which is so fundamentally simple that when once installed no adjustments are necessary, thereby rendering it practically foolproof.

Another object of the invention is the provision of an automatic power transmission in which the bearings are all sealed in or self-lubricating, thereby obviating the necessity of periodic lubrication and servicing.

The foregoing and other objects and advantages of the invention will become more apparent as the description proceeds, reference being made from time to time to the accompanying drawings, forming part of the within disclosure, in which drawings.

Figure 1:
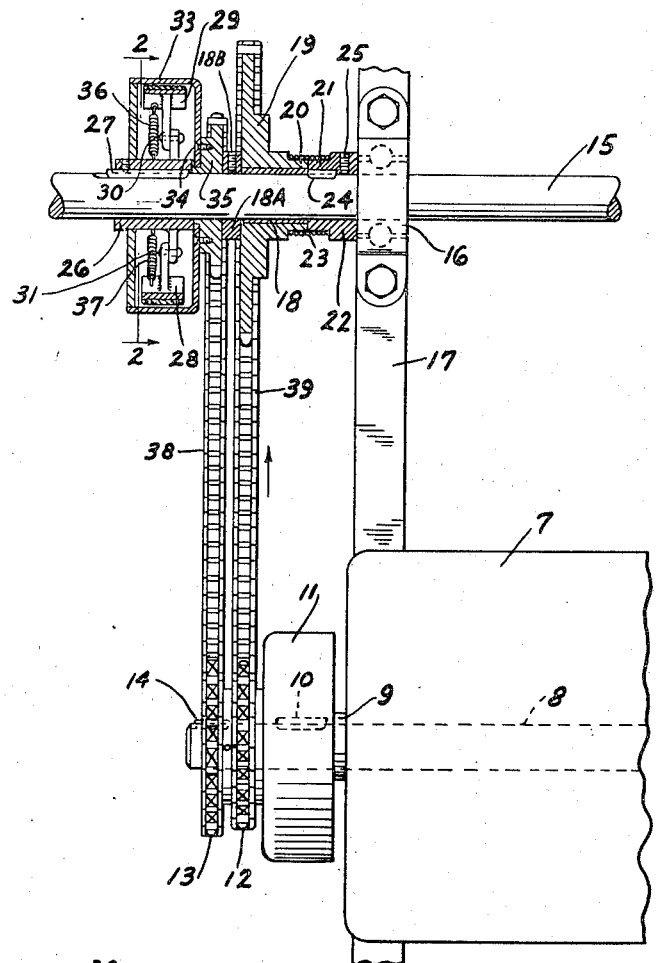
Fig. 1 is a plan view with parts broken away, and parts in section, of a device embodying the invention.
Figure 2:
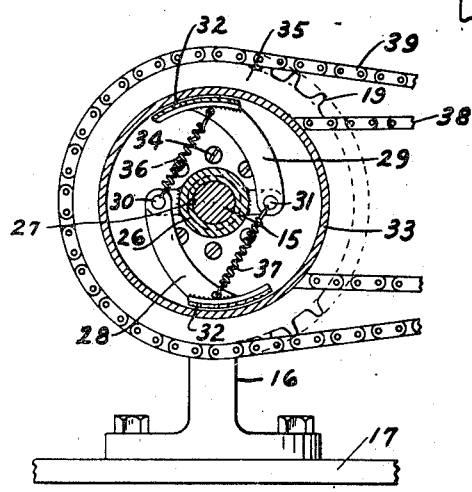
Fig. 2 is a section taken substantially on the line 2—2 of Fig. 1.

Referring now more particularly to the drawings, it will be understood that in the embodiment herein disclosed, the reference character 7 indicates a variable speed power generator unit, such as a gasoline engine or the like, having a drive shaft 8, to which is mounted for rotation a centrifugal type automatic clutch, the driving element 9 of which is keyed, as at 10, to the shaft 8, and the driven element 11 of which has attached thereto a sprocket 12. A second sprocket wheel 13 is keyed, as at 14, direct to the shaft 8 and rotates therewith at all times.

Mounted parallel to and in spaced relation with the shaft 8 is a countershaft 15, which is supported for rotation in suitable self-lubricating bearings 16 secured to the stringer 17. Mounted for free rotation about a self-lubricating bearing 18, positioned on the shaft 15 is a sprocket wheel 19. The bearing 18 has a shoulder 18A, and is secured to the shaft 15 by a set screw 18B. The sprocket 19 has an extended hub portion 20, which cooperates with the portion 21 of the collar 22, to form clutch elements adapted to engage the clutch spring 23 which is mounted thereon for the purposes hereinafter described. The clutch just described is over-running and engages only in one direction. That is, when the speed of the shaft 15 overruns the speed of the sprocket 19 the clutch slips.

The collar 22 is keyed to the countershaft 15, as at 24, and rotates therewith. A set screw 25 positions the collar 22 against longitudinal movement on the shaft 15. Also mounted on the countershaft 15 is an automatic centrifugal type clutch having its driving member 26 keyed, as at 27, to the countershaft 15. The member 26 is provided with clutch feet 28 and 29, which are pivoted, as at 30, and 31, to the driving member 26. The feet 28 and 29 have friction pads 32 arranged to contact the inside surface of the clutch drum 33, which is secured, as at 34, to a sprocket wheel 35, the latter being mounted for free rotation on the shaft 15. The feet 28 and 29 are normally held clear of the clutch drum 33 by means of springs 36 and 37. Sprocket chains 38 and 39 respectively engage the sprockets 13 and 35 and the sprockets 12 and 19. The sprockets 13 and 35 in this embodiment have a speed ratio of one to one, and the sprockets 12 and 19 have a speed ratio of two to one. In this embodiment, the centrifugal clutch 11 mounted on the shaft 8 is adapted to engage at 1900 R. P. M. of the engine 7, and the clutch 33 mounted on the countershaft 15 is adapted to engage at 1600 R. P. M.

It will be understood, however, that other speeds and ratios may be employed with the device depending upon the results desired. A typical operating cycle is as follows:

When the engine speed reaches 1900 R. P. M. the clutch 11 engages, causing the sprockets 12 to rotate at the same speed, and since the speed ratio of sprockets 12 and 19 is two to one, the sprocket 19 will rotate at 950 R. P. M. As the sprocket 19 rotates, the spring 23 will start to tighten about the members 20 and 21 and rotation will be imparted to the countershaft 15. The clutch 11 remains in engagement until the countershaft 15 has attained a speed of 1600 R. P. M., at which time the engine 7 will then be turning up 3200 R. P. M. When the engine reaches a speed of 3300 R. P. M. the countershaft 15 and clutch member 26 will be rotating at 1650 R. P. M. which is the speed at which the clutch members 28 and 29 are set to engage the clutch drum 33 to rotate the sprocket 35. As the sprockets 13 and 35 have the same speed ratio, a further increase of speed of the sprocket 13 will correspondingly increase the speed of the countershaft 15, at which time the shaft 15 will be rotating faster than the sprocket 19, and because of the one way clutching action of the spring 23 the sprocket 19 will then run free of the shaft 15, and the shaft 15 will be driven through the sprockets 13 and 35. When the engine speed falls below 3300 the clutch 33 cuts out, and the power is then transmitted through the sprockets 12 and 19 as previously described. Further reduction in engine speed to and below 1900 R. P. M. causes the clutch 11 to cut out and the engine then runs entirely free of the transmission.

Having described my invention, what I claim and desire to secure by Letters Patent is:

1. The combination with a variable speed engine, of an automatic transmission comprising a centrifugal clutch having its driving element keyed to the drive shaft of said engine, a sprocket on said drive shaft secured to the driven element of said clutch, a countershaft, a sprocket freely mounted for rotation on said countershaft, a chain on said sprockets, an overrunning clutch between said freely mounted sprocket and said countershaft, a centrifugal clutch having one of its elements keyed to said countershaft and another of its elements secured to a sprocket rotatable on said countershaft, a sprocket keyed to the drive shaft of said engine, and a chain over said two last named sprockets.

2. The combination defined in claim 1, in which there is a speed ratio of substantially two to one between the said two first named sprockets, and a speed ratio of substantially one to one between said two last named sprockets.

3. The combination defined in claim 1, in which said overrunning clutch consists of a coil spring member loosely fitted about the ends of a pair of abutting collars, one of which said collars is secured to said first named freely mounted sprocket, and the other of said collars is keyed to said countershaft.

4. In a device of the character described in combination, a variable speed power generator having a drive shaft, a pair of sprockets on said drive shaft, one of which is keyed to said shaft and the other of which is secured to one element of a centrifugal clutch, the other element of which is keyed to said drive shaft, a countershaft in spaced alignment with the said drive shaft, a pair of sprockets on said countershaft, one of said last named sprockets being freely rotatable and connectable with said countershaft through an overrunning spring clutch, and the other of said last named sprockets being connectable to said countershaft through a centrifugal clutch, there being chains respectively connecting a sprocket of one pair to a sprocket of the other pair.

5. The combination defined in claim 4, in which one chained together pair of sprockets has a predetermined speed ratio and the other chained together pair of sprockets has a different speed ratio.

6. The combination defined in claim 4, in which the rotatable elements of the assembly are provided with self lubricating bearing members.

MARCELLUS W. GREDELL.

No references cited.